United States Patent [19]

Brown, Sr.

[11] 4,215,883
[45] Aug. 5, 1980

[54] COUPLING FOR PIPES AND FITTINGS

[76] Inventor: Theodore C. Brown, Sr., 601 Beaver Dam Rd., Raleigh, N.C. 27607

[21] Appl. No.: 29,283

[22] Filed: Apr. 11, 1979

[51] Int. Cl.³ .............................................. F16L 21/06
[52] U.S. Cl. ..................................... 285/236; 285/373
[58] Field of Search .............. 285/373, 236, 419, 112, 285/369, 367

[56] References Cited

U.S. PATENT DOCUMENTS

| | | | |
|---|---|---|---|
| 982,028 | 1/1911 | Austin | 285/373 X |
| 1,905,324 | 4/1933 | Waters | 285/373 X |
| 2,936,186 | 5/1960 | Dunmire | 285/373 |
| 3,006,663 | 10/1961 | Bowne | 285/367 X |
| 3,084,959 | 4/1963 | Stanton | 285/373 X |
| 3,479,066 | 11/1969 | Gittleman | 285/236 |
| 3,771,820 | 11/1973 | Hoss, Sr. et al. | 285/373 |
| 3,801,141 | 4/1974 | Hollingsworth | 285/236 |
| 3,966,237 | 6/1976 | Thiessen | 285/112 |

FOREIGN PATENT DOCUMENTS 6703124  8/1968  Netherlands .............................. 285/373

*Primary Examiner*—Thomas F. Callaghan
*Attorney, Agent, or Firm*—Mills & Coats

[57] ABSTRACT

This invention is a ridged pipe coupling so shaped as to allow the same to be tensioned down tightly on a pipe or fitting regardless of slight irregularities or size variations. The coupling also has provision for use in conjunction with both plain fittings, fittings having a bead, or a combination of the two. A plurality of different types of gaskets can be used with the present invention and the coupling bolts can be either threaded into the coupling itself or used in conjunction with standard bolt and nut type fasteners.

5 Claims, 9 Drawing Figures

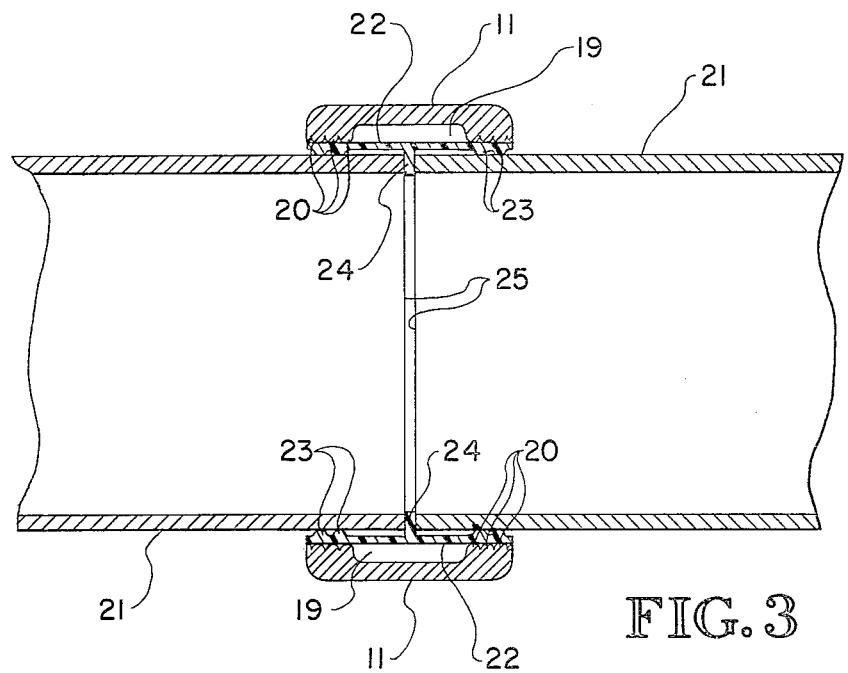
FIG. 3
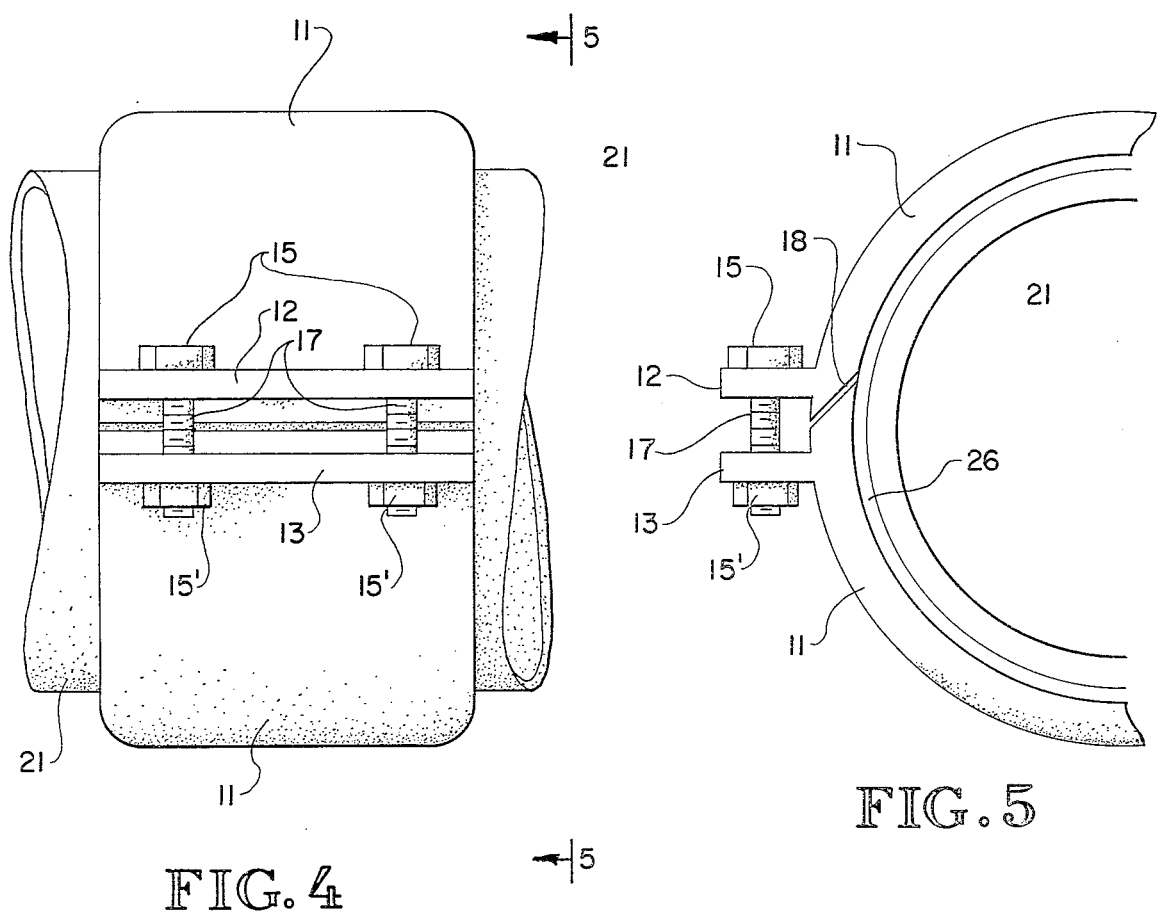
FIG. 4
FIG. 5

COUPLING FOR PIPES AND FITTINGS

FIELD OF INVENTION

This invention relates to plumbing equipment and more particularly to ridged couplings used in conjunction with pipes, fittings and the like.

BACKGROUND OF INVENTION

Since man first began transferring water and other fluids from one point to another through conduits or pipes connecting lengths of the same has been a problem. Over the years various types of couplings have been devised to join pipes and fittings. These have included clamp on couplings, wrap around couplings, band couplings, and poured couplings just to mention a few. Each of these various coupling means have had their own peculiar problems. For example, ridged clamp on couplings do not provide for complete wrap around pressure if provision is made for surface irregularities and slight size variations. Wrap around couplings are flimsy and do not give stiffness as is usually desired and is often necessary. Use of settable material for pouring into the joint such as lead thermoplastic and the like are time consuming to use, requiring inordinate amount of skill, and on occasion can be extremely dangerous to use.

SUMMARY OF INVENTION

After much research and study into the above-mentioned problems, the present invention has been developed to provide a relatively ridged, clamp type coupling which can be either thread bolted or through bolted into place. The coupling of the present invention also provides for substantial continuous pressure completely about the pipe or fitting to eliminate leaks in noncontact areas while at the same time providing for surface irregularities and diameter variations which invariably occur from one pipe or fitting to another even though they are all rated at the same size.

Means have also been designed to the present invention to allow both beaded and unbeaded pipes or fittings to be used in conjunction with the same coupling without modification. One-half of the coupling disclosed is a mere image of the other half so that a single casting can be used for any given size connection.

In view of the above, it is an object of the present invention to provide a pipe coupling having two halves beveled at an angle of approximately 45 degrees to accept pipes and fittings of slightly different diameters without loss of the clamp/seal effect.

Another object of the present invention is to provide a coupling with semi-circular beads on the clamping surface thereof to provide positive sealing of unbeaded gaskets.

Another object of the present invention is to provide a coupling which does not require special gaskets to properly accomplish its intended purpose.

Another object of the present invention is to provide a pipe coupling having an interior surface geometry of such design to provide a cavity to accept fittings having a bead thereon as well as plain pipes and fittings.

Another object of the present invention is to provide a coupling which also readily serves as a hanger support.

Another object of the present invention is to provide positive tangential torque through bolt and ear arrangements in a ridged clamp type covering.

Another object of the present invention is to provide an improved pipe coupling which eliminates flexure problems.

Another object of the present invention is to provide an improved clamp type coupling which will maintain its seal integrity even in a pressurized condition.

Another object of the present invention is to provide an improved coupling which allows an installer to make a reliable, longlasting, trouble free joint in pipes and fittings.

Another object of the present invention is to provide an improved bolting method for use in conjunction with pipe and fixture couplings.

Other objects and advantages of the present invention will become apparent and obvious from a study of the following description and the accompanying drawings which are merely illustrative of such invention.

BRIEF DESCRIPTION OF THE DRAWINGS

FIG. 3 is a sectional view taken through lines 3—3 of FIG. 1;

FIG. 4 is a side elevational view of a double bolt clamp.

FIG. 5 is a sectional view taken through lines 5—5 of FIG. 4;

DESCRIPTION OF INVENTION

Figure 1:
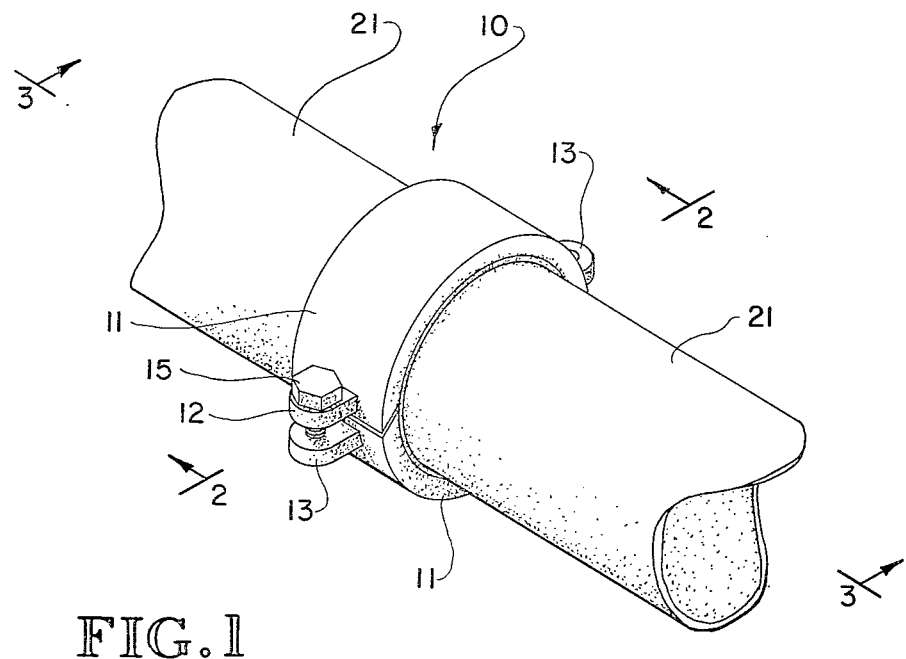
FIG. 1 is a perspective view of a joint formed through use of the coupling of the present invention.

With further reference to the drawings, the coupling of the present invention, indicated generally at 10, is composed of a pair of symmetrical coupling halves 11. Each of these halves includes a pair of outwardly projecting ears 12 and 13 integrally formed on opposite sides thereof.

Particularly in smaller diameter couplings, the ear 12 can have an opening 14 bored therein of a slightly greater diameter than the bolt 15 adapted to be used therewith. A threaded opening 16 is provided in ear 13 and is so sized as to be adapted to threadingly receive the threaded portion 17 of bolt 15.

Figure 2:
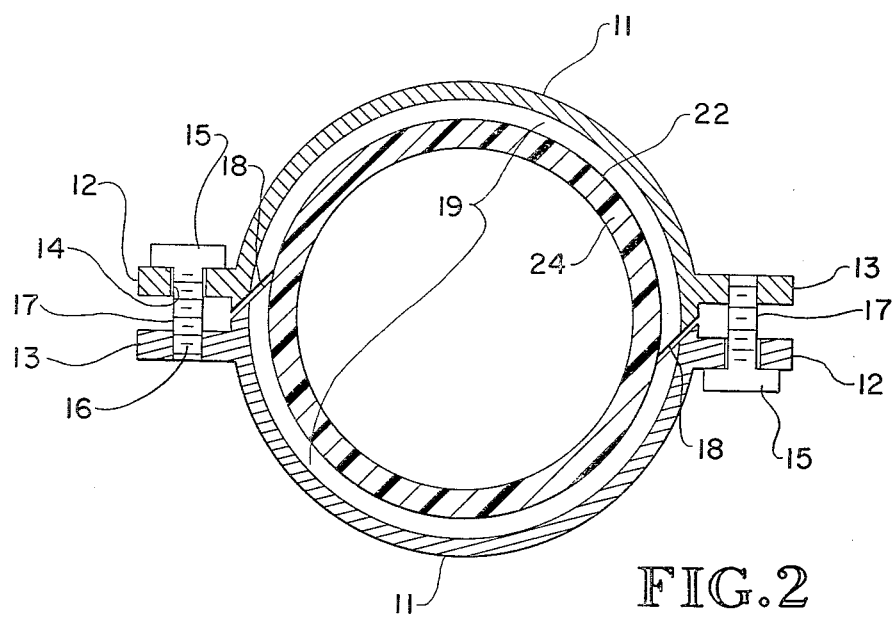
FIG. 2 is a sectional view taken through lines 2—2 of FIG. 1.

Since each of the coupling halves 11 are identically shaped, when they are put together with the ear 12 of one half adjacent the ear 13 of the other half, a circular coupling is provided as shown in the sectional view of FIG. 2.

The abutting edges 18 of each of the coupling halves 11 are beveled at approximately 45 degrees. This gives an overlapping joint between the two halves 11 and allows for variations in pipe size to be compensated for without losing the 360 degree circular clamping effect.

A cavity or void 19 is provided about the interior of each of the coupling halves 11 as seen clearly in the sectional views of the present invention. This interior circumferential cavity allows the coupling to be used with pipes having beaded ends as well as unbeaded pipes. The fact that the coupling 10 of the present invention can be used to join two pipes with beads, two pipes without beads, or a pipe with a bead to a pipe without a bead gives it universal application.

On either side of cavity 19 are provided bead like sealing ridges 20 that are generally semicircular in cross section. A plurality of these ridges are preferably provided adjacent each other to assure positive sealing under clamping torque.

A soft, compressible seal or gasket is provided for use between the coupling 10 and the pipes or fittings 21. This gasket can be of the type commercially available and indicated at 22 having its own sealing beads or ridges 23 on the interior thereof and a sealing flange 24 adapted to be disposed between the abutting ends 25 of the pipes or fittings 21 as can clearly be seen in sectional FIGS. 2 and 3.

Figure 6:
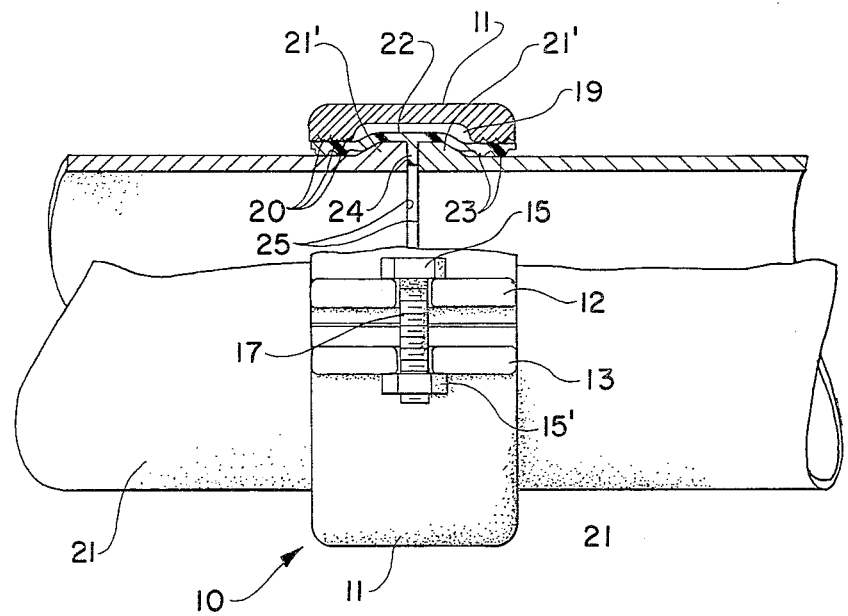
FIG. 6 is a partially cutaway side elevational view of the slightly modified single bolt version of the present invention.
Figure 7:
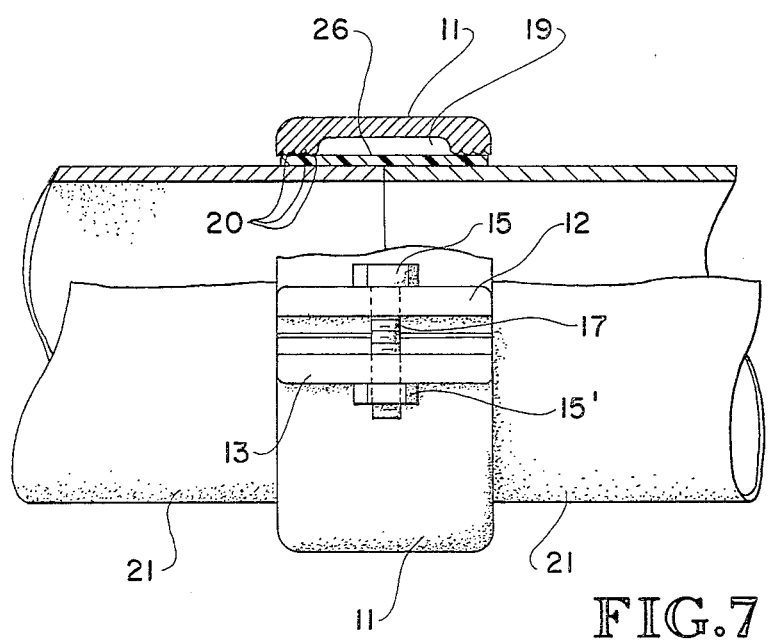
FIG. 7 is a partially cutaway side elevational view of the present invention used with a plain sleeve gasket.

Because of the sealing ridges 20 provided on the interior of each of the coupling halves 11 of the present invention, a plain sleeve-like gasket 26 also can be used. This type gasket is illustrated in partially cutaway FIGS. 6 and 7.

It should be noted, because of the interior geometry of the coupling 10, either the flange gasket 22 or the sleeve gasket 26 can be used either with pipes or fittings having a bead 21' or with ones that are beadless. The sleeve gasket on the other hand is more readily adaptable for use with mixed pipes i.e., one with a bead and one without.

In couplings for larger diameter pipes, as well as whenever a threaded opening in one of the ears is stripped, a bolt 15 slightly longer than the distance between the adjoining coupling ears is provided and a nut is threaded onto the bolt to secure the coupling halves together. Also couplings for larger preferably have a plurality of securing bolts through each of the ears to obtain proper clamping torque.

Figure 8:
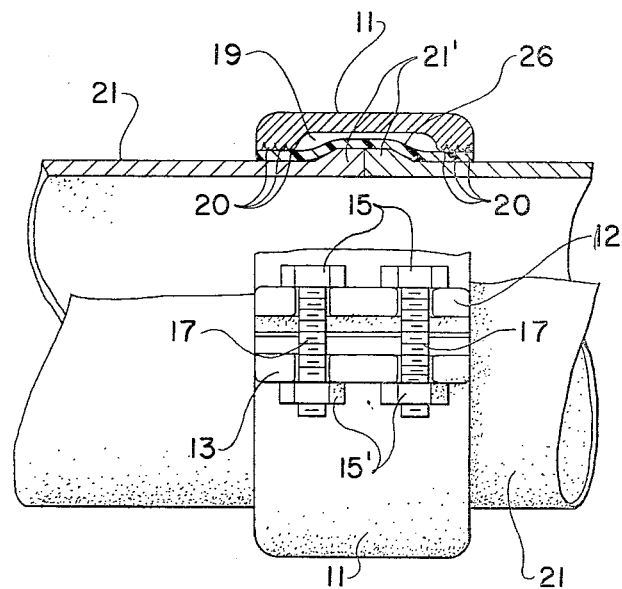
FIG. 8 is a partially cutaway side elevational view of a slightly modified double bolt version of the present invention.
Figure 9:
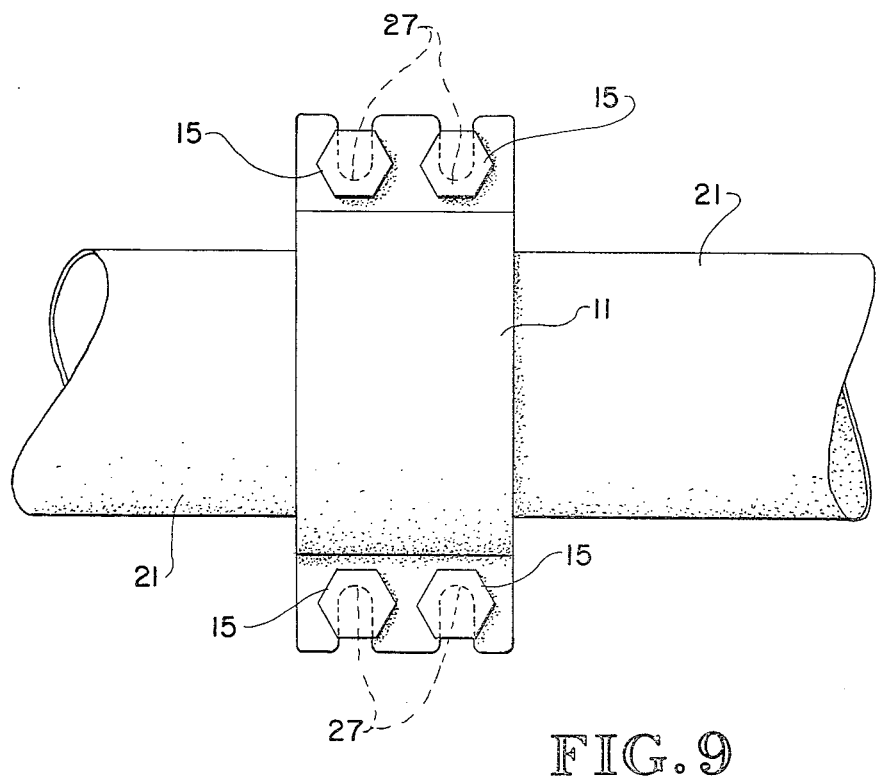
FIG. 9 is a top plan view of the modification shown in FIG. 8.

A modification to the ears 12 and 13 of the coupling 10 is shown in FIGS. 8 and 9 where, rather than openings such as that indicated at 14 and 16 being provided, U-shaped slots 27 are provided. These slots, of course, allow for quick connection and disconnection and in some applications are considered a distinct advantage since the bolts can simply be slipped onto the ears rather than passed therethrough. On the other hand through bolting such as that shown in FIGS. 1, 2, 4, and 5 allows the coupling itself to be used as a hanger bracket when the bolt 15 is secured to a conventional pipe hanger (not shown).

To use the coupling of the present invention a gasket of the type shown at 22 or 26 (or other suitable means) is slipped over the adjacent ends of the pipes or fittings 22. The two coupling halves 11 are then placed about the gasket and bolts 15 (with or without nuts 15' depending on the configuration) can be torqued down to the proper clamping pressure. The coupling will then provide a rigid, completely sealed, long lasting joint. If the pipes are dependingly suspended from a hanger, the lower end thereof can connectingly engage one or more of the bolts 15 thus making the coupling 10 a combination pipe joint and hanger bracket.

From the above, it is obvious that the present invention provides a simple, relatively inexpensive coupling for pipes and other means which is simple to install, is self-compensating for diameter variations of the coupled units, and applies 360 degrees clamping effect for sealing the joint without the requirement of specially formed and shaped gaskets.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A pipe and fixture type coupling comprising: a pair of symmetrical, generally semi-circular coupling halves having abutting edges, said edges being unidirectionally beveled to lie juxtaposed to each other; a cavity provided in each of said halves which is open to the central interior circumference thereof whereby pipes and fixtures with beaded ends can be joined as readily as plain pipes and fixtures without the requirement of special adapters; a plurality of bead like sealing ridges disposed on the outer interior circumference on each side of said cavity whereby a plain, sleeve-like gasket having a constant external cylindrical surface can be used with said coupling; at least one ear like flange outwardly projecting from each of said halves adjacent said edges; adjustable securing means operatively associated with each of said flanges so that said coupling halves can be secured about adjacent pipes or fittings and tensionally held in place. whereby said ridges engage the end portions of said gasket and press the gasket into sealing engagement with the pipes or fittings, and the external surface of the central portion of said gasket is radially spaced from the central interior surfaces of the coupling halves.

2. The coupling of claim 1 wherein said edges are beveled at an angle of approximately 45 degrees.

3. The coupling of claim 1 wherein the adjustable securing means are bolts passed through one of said flanges and threadingly engaging the adjacent flange.

4. The coupling of claim 1 wherein said securing means are bolts, and cooperating nuts, each of said bolts passing through adjacent flanges with a nut threaded thereon.

5. The coupling of claim 1 wherein said flanges have at least one U-shaped slot provided in the outer edge thereof whereby a bolt or other securing means can be readily connected thereto.

* * * * *